(12) United States Patent
Park et al.

(10) Patent No.: US 11,536,207 B2
(45) Date of Patent: Dec. 27, 2022

(54) APPARATUS OF CONTROLLING VEHICLE AND METHOD THEREOF

(71) Applicants: Hyundai Motor Company, Seoul (KR); Kia Corporation, Seoul (KR)

(72) Inventors: Yeongseop Park, Seoul (KR); Dong Hee Han, Gyeonggi-do (KR); Jong Il Park, Seoul (KR); Hyunjin Kang, Gyeonggi-do (KR); Heechang Oh, Gyeonggi-do (KR); Jaun Ku, Gyeonggi-do (KR); Seungwoo Hong, Seoul (KR); Jonghyeok Lee, Gyeonggi-do (KR); Kwanhee Lee, Gyeonggi-do (KR); Dongwon Jung, Gyeonggi-do (KP); Jaeheun Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/517,725

(22) Filed: Nov. 3, 2021

(65) Prior Publication Data
US 2022/0056859 A1 Feb. 24, 2022

Related U.S. Application Data

(62) Division of application No. 17/101,940, filed on Nov. 23, 2020.

(30) Foreign Application Priority Data

Jun. 8, 2020 (KR) .......................... 10-2020-0068757

(51) Int. Cl.
| | |
|---|---|
| *F02D 13/04* | (2006.01) |
| *F02D 35/02* | (2006.01) |
| *F02D 13/02* | (2006.01) |
| *F02B 37/12* | (2006.01) |
| *F02D 41/00* | (2006.01) |

(Continued)

(52) U.S. Cl.
CPC ............ *F02D 35/027* (2013.01); *F02B 37/12* (2013.01); *F02D 13/0234* (2013.01); *F02D 41/009* (2013.01); *F02P 5/06* (2013.01); *F02P 5/152* (2013.01)

(58) Field of Classification Search
CPC ....... F02D 41/3014; F02B 11/02; F02B 23/02
See application file for complete search history.

(56) References Cited

U.S. PATENT DOCUMENTS 10,961,942 B2 * 3/2021 Guerriero ............. F02P 5/1502
10,982,616 B2   4/2021 Inoue et al.

(Continued)

*Primary Examiner* — John Kwon
(74) *Attorney, Agent, or Firm* — Fox Rothschild LLP

(57) ABSTRACT

An apparatus of controlling a vehicle and a method thereof are provided. The operating region of an engine is operated with theoretical air-fuel ratio. The apparatus includes a supercharger that supplies compressed air to a the combustion chamber of the engine and a spark plug that ignites mixed air supplied to the combustion chamber. An intake valve selectively opens and closes the combustion chamber for inflowing the mixed air therein. A variable valve apparatus adjusts an opening timing and closing timing of the intake valve and a controller adjusts an ignition timing of the spark plug and the closing timing of the intake valve through the variable valve apparatus based on the operating region of the engine.

5 Claims, 6 Drawing Sheets

(51) Int. Cl.
 *F02P 5/152* (2006.01)
 *F02P 5/06* (2006.01)

(56) References Cited

U.S. PATENT DOCUMENTS

| | | |
|---|---|---|
| 2004/0069271 A1 | 4/2004 | Kanno et al. |
| 2006/0016431 A1* | 1/2006 | Mashiki ............ F02D 41/3094 123/431 |
| 2008/0190396 A1 | 8/2008 | Miyanoo |
| 2017/0276082 A1 | 9/2017 | Hotta et al. |
| 2019/0195161 A1* | 6/2019 | Guerriero .............. F02P 5/045 |
| 2021/0381449 A1* | 12/2021 | Park ..................... F02D 35/027 |

* cited by examiner

APPARATUS OF CONTROLLING VEHICLE AND METHOD THEREOF

CROSS-REFERENCE TO RELATED APPLICATION

This application is a Divisional of U.S. application Ser. No. 17/101,940, filed Nov. 23, 2020, which claims priority to and the benefit of Korean Patent Application No. 10-2020-0068757 filed on Jun. 8, 2020, the entire contents of which are incorporated herein by reference.

BACKGROUND

(a) Field of the Disclosure

The present disclosure relates to an apparatus of controlling a vehicle and a method thereof, and more particularly, to an apparatus of controlling a vehicle and a method thereof that suppress knocking generated in an engine and reduce carbon monoxide emission.

(b) Description of the Related Art

Generally, fuel amount of a gasoline engine is determined based on a theoretical air-fuel ratio. As fuel amount approaches the theoretical air-fuel ratio, fuel may be completely combusted in the cylinder and purifying efficiency of catalyst for purifying exhaust gas is improved. However, when knocking occurs in a high load region, a rich burn with a higher fuel ratio than the theoretical air-fuel ratio is performed. When the rich burn is performed, the knocking margin is secured and the exhaust temperature may be reduced, thereby preventing damage to parts around the engine and increasing engine output. On the other hand, when rich burn is performed, the exhaust amount of carbon monoxide (CO) is increased excessively.

In addition, when the engine operates in a low speed region, scavenging is performed to secure a turbocharger's performance, but this an exhaust amount of carbon monoxide to increase. However, when the engine is operated with the theoretical air/fuel ratio (theoretical air-fuel ratio) in all operating regions, the rich burn is unable to be performed to reduce knocking. Therefore, research is required to suppress knocking and reduce the amount of carbon monoxide exhaust when the engine is operated with the theoretical air-fuel ratio in all operating regions.

The above information disclosed in this section is merely for enhancement of understanding of the background of the disclosure, and therefore it may contain information that does not form the prior art that is already known in this country to a person of ordinary skill in the art.

SUMMARY

An exemplary embodiment of the present disclosure provides an apparatus of controlling a vehicle and a method thereof that suppress knocking and reduce the exhaust amount of carbon monoxide when an engine is operated at the theoretical air/fuel ratio in all operating regions.

An apparatus of controlling a vehicle in which all operating region of an engine are operated with theoretical air-fuel ratio according to an exemplary embodiment of the present disclosure may include a supercharger configured to supply compressed air to a the combustion chamber of the engine, an spark plug configured to ignite mixed air supplied to the combustion chamber, an intake valve configured to selectively open and close the combustion chamber for inflowing the mixed air therein, a variable valve apparatus configured to adjust an opening timing and closing timing of the intake valve, and a controller configured to adjust an ignition timing of the spark plug and the closing timing of the intake valve through the variable valve apparatus based on the operating region of the engine.

The operating region may include a first operating region having a low-load region and a middle-load region, and a second operating region having a high-load region. When a knocking is generated in the first operating region, the controller may be configured to retard the ignition timing comparing to a normal ignition timing by a predetermined crank angle. When the knocking is not generated in the first operating region, the controller may be configured to restore the ignition timing to the normal ignition timing.

When the knocking is generated in the second operating region, the controller may be configured to advance the closing timing of the intake valve by a predetermined crank angle from an initial closing timing, and retard the ignition timing comparing to a normal ignition timing by a predetermined crank angle. When the closing timing of the intake valve reaches a target closing timing, the controller may be configured to restore the ignition timing to the normal ignition timing. When the knocking is not generated after the ignition timing is restored to the normal ignition timing, the controller may be configured to adjust the closing timing of the intake valve to the initial closing timing. When the knocking is generated in the second operating region, the controller may be configured to increase a supercharging pressure of the compressed air through the supercharger.

A method of controlling a vehicle in which all operating region of an engine are operated with theoretical air-fuel ratio according to another exemplary embodiment of the present disclosure may include detecting whether a knocking is generated in a combustion chamber of the engine by a vibration sensor, when the knocking is generated in the combustion chamber, adjusting an ignition timing by an spark plug based on operating regions of the engine by a controller, and adjusting a closing timing of an intake valve by a variable valve apparatus by the controller.

The operating region may include a first operating region including a low-load region and a middle-load region, and a second operating region including a high-load region. When a knocking is generated in the first operating region, by the controller, the ignition timing by the spark plug may be retarded compared to a normal ignition timing by a predetermined crank angle. When the knocking is not generated in the first operating region, by the controller, the ignition timing by the spark plug may be restored to the normal ignition timing.

When the knocking is generated in the second operating region, by the controller, the closing timing of the intake valve may be advanced by a predetermined crank angle from an initial closing timing, and the ignition timing may be retarded by a predetermined crank angle comparing to a normal ignition timing. When the closing timing of the intake valve reaches a target closing timing, by the controller, the ignition timing may be restored to the normal ignition timing. When the knocking is not generated after the ignition timing is restored to the normal ignition timing, by the controller, the closing timing of the intake valve may be restored to the initial closing timing.

The method according to another exemplary embodiment of the present disclosure may further include increasing a supercharging pressure of the compressed air through the supercharger by the controller. According to the an exemplary embodiment of the present disclosure as described above, it may be possible to suppress the occurrence of knocking and reduce the exhaust amount of carbon monoxide by adjusting the closing timing of the intake valve and the ignition timing of the spark plug.

BRIEF DESCRIPTION OF THE DRAWINGS

The drawings are used to be referred to in describing exemplary embodiments of the present disclosure, so a technical concept of the present disclosure should not be meant to restrict the disclosure to the accompanying drawings.

DETAILED DESCRIPTION

Figure 1:
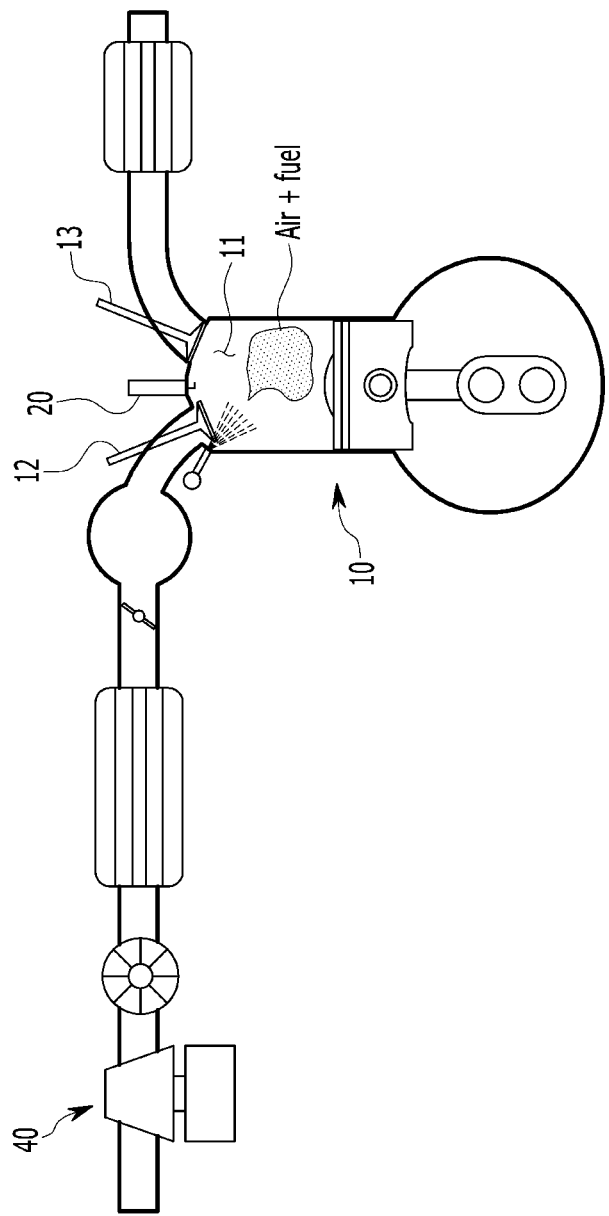
FIG. 1 is schematic diagram illustrating an engine system applied with an apparatus of controlling a vehicle according to an exemplary embodiment of the present disclosure.

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

To clarify the present disclosure, portions irrespective of description are limited and like numbers refer to like elements throughout the specification. The sizes and thicknesses of the configurations shown in the drawings are provided selectively for the convenience of description, such that the present disclosure is not limited to those shown in the drawings and the thicknesses are exaggerated to make some parts and regions clear.

Furthermore, the control logic of the present disclosure may be embodied as non-transitory computer readable media on a computer readable medium containing executable program instructions executed by a processor, a controller, or the like. Examples of computer readable media include, but are not limited to, ROM, RAM, compact disc (CD)-ROMs, magnetic tapes, floppy disks, flash drives, smart cards, and optical data storage devices. The computer readable recording medium can also be distributed in network coupled computer systems so that the computer readable media are stored and executed in a distributed fashion, e.g., by a telematics server or a controller area network (CAN).

Hereinafter, an apparatus of controlling a vehicle according to an exemplary embodiment of the present disclosure will be described in detail with reference to accompanying drawings.

Figure 2:
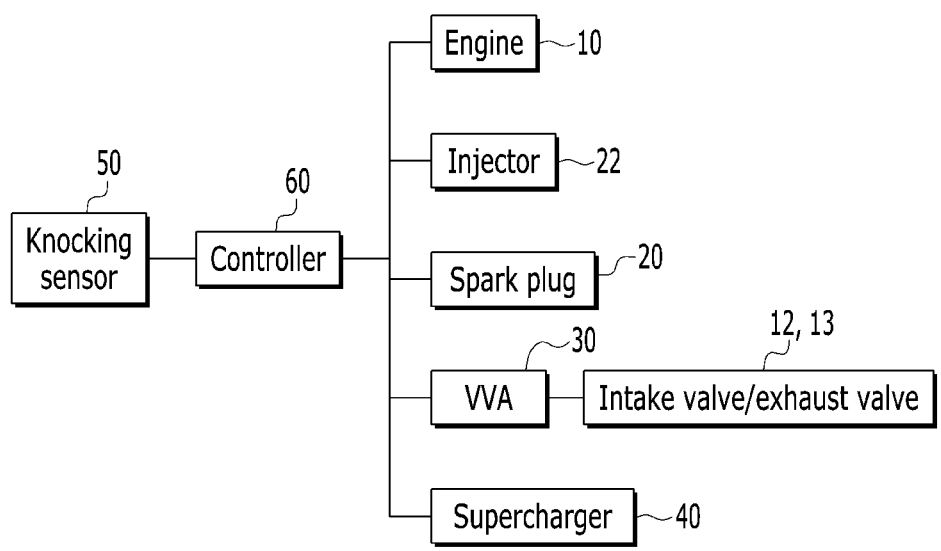
FIG. 2 is a block diagram illustrating an apparatus of controlling a vehicle according to an exemplary embodiment of the present disclosure.

FIG. 1 is schematic diagram illustrating an engine system applied with an apparatus of controlling a vehicle according to an exemplary embodiment of the present disclosure. FIG. 2 is a block diagram illustrating an apparatus of controlling a vehicle according to an exemplary embodiment of the present disclosure. First, an engine system applied an apparatus of controlling a vehicle according to an exemplary embodiment of the present disclosure will be described. As shown in FIG. 1 and FIG. 2, an engine system according to an exemplary embodiment of the present disclosure may include an engine 10, a supercharger 40, a spark plug 20, a variable valve apparatus 30 and a controller 60.

In particular, the engine 10 may include at least one combustion chamber 11 that generates power required for driving the vehicle by burning fuel. The engine 10 may include an intake valve 12 selectively opening or closing for supplying air and fuel into the combustion chamber 11, and an exhaust valve 13 selectively opening or closing for exhausting exhaust gas generated from the combustion chamber 11.

The variable valve apparatus 30 (VVA) may be configured to adjust an opening timing and a closing timing of the intake valve 12 and/or the exhaust valve 13. The variable valve apparatus 30 according to an exemplary embodiment of the present disclosure may be a variable valve timing apparatus. The variable valve timing apparatus is widely known in the art, so a more detailed description thereof will not be presented in the present specification. The spark plug 20 may ignite a mixed air (e.g., fuel and air) inflow into the combustion chamber 11 through arc discharge. The mixed air injected into the combustion chamber 11 by the injector 22 may be ignited by arc discharge of the spark plug 20, and driving power of a vehicle may be generated through a compression stroke of a high temperature and a high pressure. The spark plug 20 may ignite the mixed air by spark discharge generated by high current supplied from an ignition coil.

The supercharger 40 may be configured to supercharge an intake air and supply the air to the combustion chamber 11 of the engine 10. Examples of the supercharger 40 may be a turbocharger or an electric supercharger. The turbocharger may be configured to rotate a turbine using pressure of exhaust gas exhausted from the engine 10, and increase an engine output by supplying the intake air having high pressure to the combustion chamber 11. The electric supercharger may be configured to compress the intake air by operating a compressor using a motor. Since the electric supercharger is operated by an electric power supplied from a batter, there is a merit that there is almost no turbo rack. The electric supercharger may include a motor and a compressor.

Figure 3:
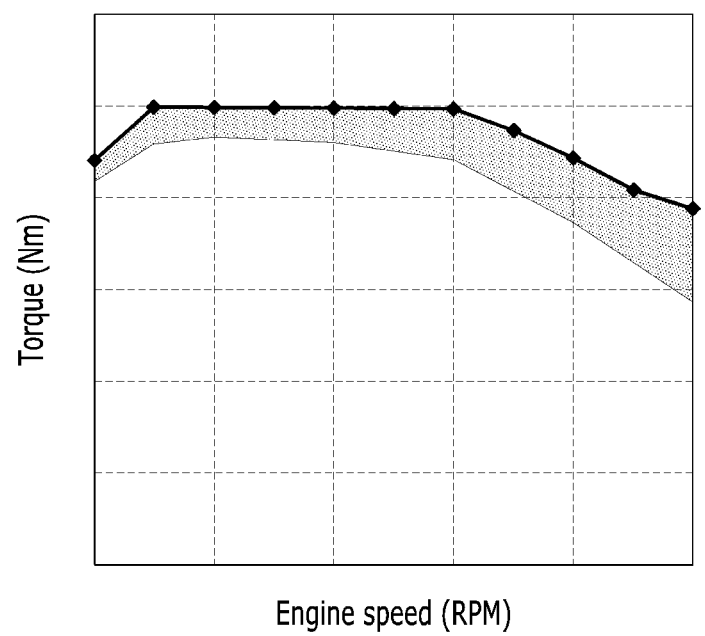
FIG. 3 is a graph illustrating an operating region of an engine according to an exemplary embodiment of the present disclosure.

The controller 60 may be configured to suppress a knocking by adjusting an operation of the variable valve apparatus 30, the spark plug 20, and the supercharger 40 based on an operating region, when the knocking is generated in the combustion chamber 11 of the engine 10. Accordingly, the controller 60 may be provided as one or more processors operated by a set program, and the set program may perform each operation of a method of operating a vehicle according to an exemplary embodiment of the present disclosure. The operating region may be divided into a first operating region and a second operating region. As shown in FIG. 3, the first operating region may include a low-load region and a middle-load region, and the second operating region may include a high-load region.

Whether the knocking is generated in the combustion chamber 11 may be detected by a knocking detecting sensor 50 provided in the combustion chamber 11. The knocking detecting sensor 50 may be a vibration sensor disposed within the combustion chamber 11 of the engine 10, or a pressure sensor configured to detect the pressure in the combustion chamber 11. But the scope of the present is not limited thereto.

Figure 4:
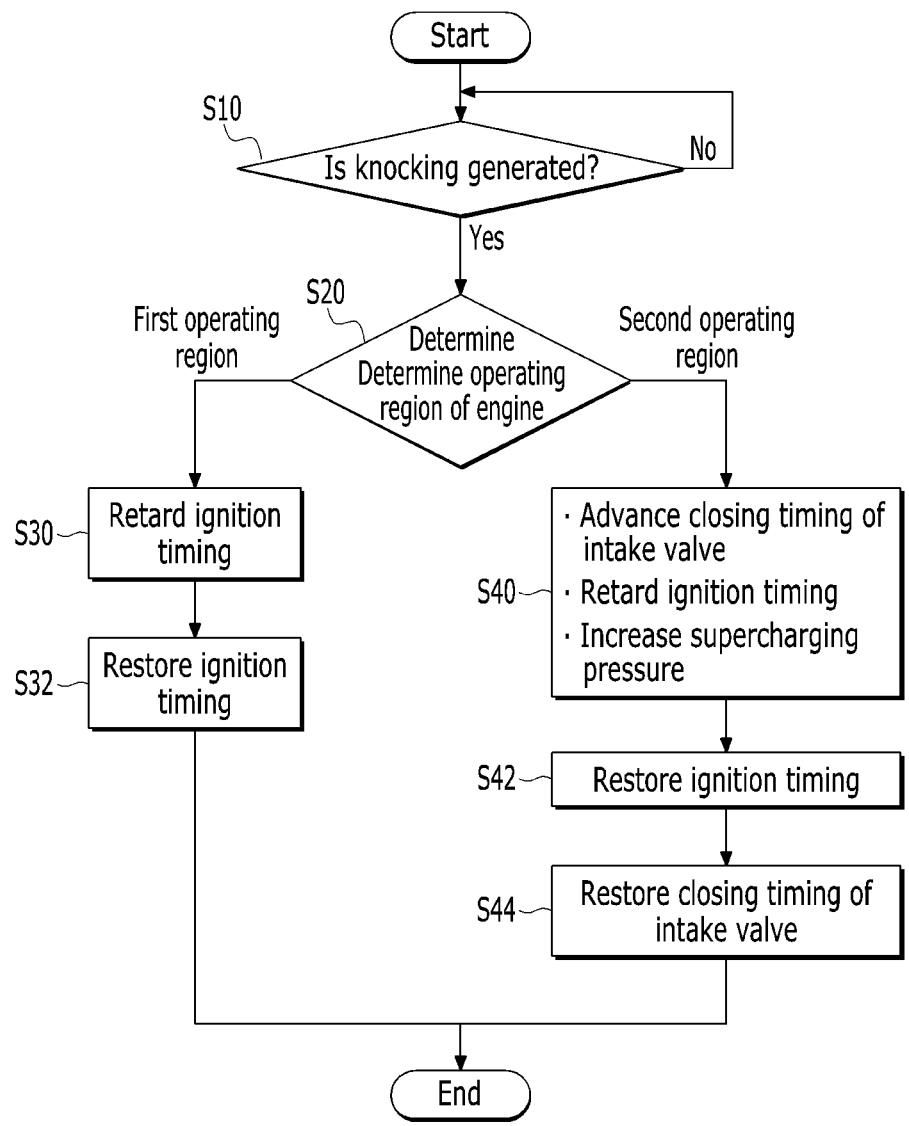
FIG. 4 is a flowchart illustrating a method of controlling a vehicle according to an exemplary embodiment of the present disclosure.
Figure 5:
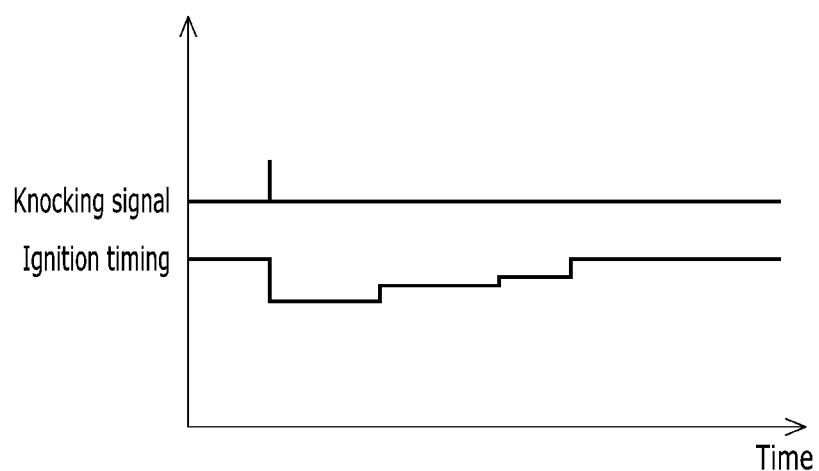
FIG. 5 is a timing diagram for explaining a method of controlling a vehicle in a first operating region according to an exemplary embodiment of the present disclosure.
Figure 6:
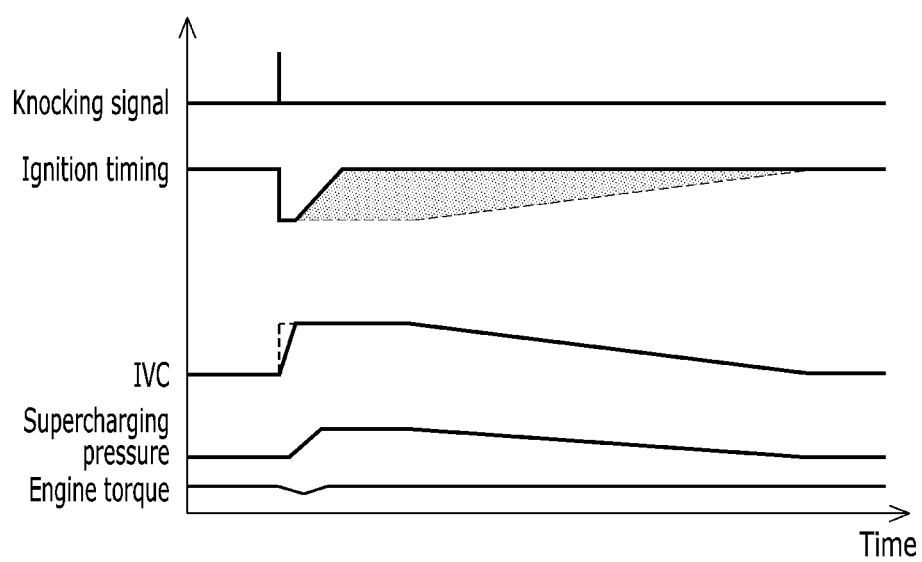
FIG. 6 is a timing diagram for explaining a method of controlling a vehicle in a second operating region according to an exemplary embodiment of the present disclosure.

Hereinafter, a method of controlling a vehicle according to an exemplary embodiment of the present disclosure will be described in detail with reference to accompanying drawings. FIG. 4 is a flowchart illustrating a method of controlling a vehicle according to an exemplary embodiment of the present disclosure. FIG. 5 is a timing diagram for explaining a method of controlling a vehicle in a first operating region according to an exemplary embodiment of the present disclosure. FIG. 6 is a timing diagram for explaining a method of controlling a vehicle in a second operating region according to an exemplary embodiment of the present disclosure.

As shown in FIG. 4, the knocking detecting sensor 50 may be configured to detect whether the knocking is generated in the combustion chamber 11, and a detecting signal of the knocking detecting sensor 50 may be transmitted to the controller 60. The controller 60 may be configured to determine whether the knocking is generated based on the detecting signal at step S10. The controller 60 may be configured to determine the operating region of the engine 10 at step S20. When the knocking is detected in the first operating region, the controller 60 may be configured to retard an ignition timing by the spark plug 20 comparing to a normal ignition timing by a predetermined crank angle at step S30 (refer to FIG. 5). For example, assume that the crank angle CA when a piston is positioned at a TDC (top dead center) is 0 degree, and the normal ignition timing is 0 CA.

When the knocking is generated in the first operating region, the controller 60 may be configured to operate the spark plug 20 to retard the ignition timing to 4 CA compared to the normal ignition timing (0 CA). Accordingly, when the ignition timing is retarded, the temperature inside the combustion chamber 11 may decrease and the knocking in the combustion chamber 11 may be suppressed. Then, when the knocking is not detected from the detecting signal of the knocking detecting sensor 50, the controller 60 may be configured to restore the ignition timing of the spark plug 20 to the normal ignition timing at step S32.

When the knocking is detected in the second operating region at step S20, the controller 60 may be configured to advance a closing timing of the intake valve 12 by a predetermined crank angle from a normal closing timing through the variable valve apparatus 30, and retard an ignition timing by the spark plug 20 comparing to a normal ignition timing by a predetermined crank angle at step S40 (refer to FIG. 6). For example, assuming that the crank angle CA when a piston is positioned at a TDC (top dead center) is 0 degree, the crank angle CA when the piston is positioned at a BDC (bottom dead center) is 180 degrees, the normal closing timing is 180 CA, and the normal ignition timing is 0 CA.

When the knocking is generated in the second operating region, the controller 60 may be configured to operate the spark plug 20 so that the ignition timing is 4 CA retarded comparing to the normal ignition timing (0 CA), and operate the variable valve apparatus 30 so that the closing timing of the intake valve 12 is 6 CA advanced from the normal closing timing (180 CA). Then, when the closing timing of the intake valve 12 reaches a target closing timing (e.g., 6 CA), the controller 60 may be configured to restore the ignition timing of the spark plug 20 to the normal ignition timing at step S42.

According to an exemplary embodiment of the present disclosure, when the knocking is generated in the second operating region, the knocking may be suppressed by advancing the closing timing of the intake valve 12 and simultaneously retarding the ignition timing of the spark plug 20. Further, when the closing timing of the intake valve 12 reaches the target closing timing, the ignition timing of the spark plug 20 may be restored to the normal ignition timing.

As described above, early in the generation of the knocking, the knocking may be suppressed through a retardation of the ignition timing the spark plug 20 with a relatively fast reaction speed. And when the closing timing of the intake valve 12 is advanced to the target closing timing, the ignition timing of the spark plug 20 may be restored to the normal ignition timing, thereby minimizing the increment of the exhaust gas temperature. In other words, the knocking may be suppressed by retardation of the ignition timing at the beginning of the knocking, and after that the closing timing of the intake valve 12 may be advanced to suppress the knocking.

Further, when the knocking is generated in the second operating region, the closing timing of the intake valve 12 and the ignition timing of the spark plug 20 may be adjusted, and the supercharging pressure by the supercharger 40 may be increased simultaneously at step S40. By increasing the supercharging pressure by the supercharger 40, it may be possible to minimize the decrement of the engine torque caused by the ignition timing and the closing timing of the intake valve 12. Thereafter, when the knocking is not detected from the detecting signal of the knocking detecting sensor 50, the controller 60 may be configured to restore the closing timing of the intake valve 12 to the normal closing timing through the variable valve apparatus 30 at step S44.

DESCRIPTION OF SYMBOLS

10: engine
11: combustion chamber
12: intake valve
13: exhaust valve
20: spark plug
30: variable valve apparatus
40: supercharger
50: knocking detecting sensor
60: controller While this disclosure has been described in connection with what is presently considered to be practical exemplary embodiments, it is to be understood that the disclosure is not limited to the disclosed exemplary embodiments. On the contrary, it is intended to cover various modifications and equivalent arrangements included within the spirit and scope of the appended claims.

What is claimed is:

1. A method of controlling a vehicle in which all operating region of an engine are operated with theoretical air-fuel ratio, comprising:
    detecting, by a vibration sensor, whether a knocking is generated in a combustion chamber of the engine;
    when the knocking is generated in the combustion chamber, adjusting by a controller, an ignition timing by a spark plug based on operating regions of the engine; and
    adjusting, by the controller, a closing timing of an intake valve by a variable valve apparatus;
    wherein the operating region includes a first operating region having a low-load region and a middle-load region and a second operating region having a high-load region;
    wherein when the knocking is generated in the second operating region, by the controller, advancing the closing timing of the intake valve by a predetermined crank angle from an initial closing timing, and retarding the ignition timing by a predetermined crank angle compared to a normal ignition timing; and
    wherein when the closing timing of the intake valve reaches a target closing timing, by the controller, restoring the ignition timing to the normal ignition timing.

2. The method of claim 1, wherein when a knocking is generated in the first operating region, by the controller, the ignition timing by the spark plug is retarded compared to a normal ignition timing by a predetermined crank angle.

3. The method of claim 2, wherein when the knocking is not generated in the first operating region, by the controller, the ignition timing by the spark plug is restored to the normal ignition timing.

4. The method of claim 1, wherein when the knocking is not generated after the ignition timing is restored to the normal ignition timing, by the controller, the closing timing of the intake valve is restored to the initial closing timing.

5. The method of claim 1, further comprising when the knocking is generated in the second operating region increasing, by the controller, a supercharging pressure of the compressed air through the supercharger.

* * * * *